(12) United States Patent
Jiang et al.

(10) Patent No.: US 11,478,990 B2
(45) Date of Patent: Oct. 25, 2022

(54) MULTI-MATERIAL 3D OBJECT PRINT METHOD AND PRINT CONTROL APPARATUS

(71) Applicant: Zhuhai Seine Technology CO., Ltd., Zhuhai (CN)

(72) Inventors: Wei Jiang, Zhuhai (CN); Wei Chen, Zhuhai (CN); Xiaokun Chen, Zhuhai (CN); Yi Zhou, Zhuhai (CN)

(73) Assignee: ZHUHAI SAILNER 3D TECHNOLOGY CO., LTD., Zhuhai (CN)

(*) Notice: Subject to any disclaimer, the term of this patent is extended or adjusted under 35 U.S.C. 154(b) by 647 days.

(21) Appl. No.: 15/884,589

(22) Filed: Jan. 31, 2018

(65) Prior Publication Data

US 2018/0147784 A1 May 31, 2018

Related U.S. Application Data

(63) Continuation of application No. PCT/CN2016/093550, filed on Aug. 5, 2016.

(30) Foreign Application Priority Data

Sep. 29, 2015 (CN) .......................... 201510641821.8

(51) Int. Cl.
 *B33Y 30/00* (2015.01)
 *B29C 64/112* (2017.01)
 (Continued)

(52) U.S. Cl.
 CPC .......... *B29C 64/393* (2017.08); *B29C 64/112* (2017.08); *B29C 64/20* (2017.08);
 (Continued)

(58) Field of Classification Search
 None
 See application file for complete search history.

(56) References Cited

U.S. PATENT DOCUMENTS 6,193,923 B1 * 2/2001 Leyden .................. B33Y 30/00
                                                      264/401
6,780,368 B2   8/2004 Liu et al.
(Continued)

FOREIGN PATENT DOCUMENTS

CN         1242293 A      1/2000
CN         1857930 A     11/2006
(Continued)

OTHER PUBLICATIONS

Nist, "Runs Test for Detecting Non-randomness", 2016 (Year: 2016).*

*Primary Examiner* — Alison L Hindenlang
*Assistant Examiner* — Debjani Roy
(74) *Attorney, Agent, or Firm* — Anova Law Group, PLLC

(57) ABSTRACT

The present invention provides a multi-material 3D object printing method and a print control apparatus. The multi-material 3D object printing method includes: a. randomly generating at least one group of area print data based on each group of area information of a target object, then correspondingly generating layer print data according to multiple groups of area information of each layer of the target object, and forming the multiple groups of layer print data into 3D object print data; b. performing layer-by-layer printing based on the 3D object print data; and c. stacking layer-by-layer printing products from the step b to form a 3D object. As disclosed, a texture of a 3D object generated by means of printing is homogeneous, thereby expanding the application scope of manufacturing a 3D object by using an inkjet (Continued)

printing technology, and implementing smooth transition between materials in different areas of a same 3D object.

16 Claims, 5 Drawing Sheets

(51) Int. Cl.
    *B29C 64/393*     (2017.01)
    *B29C 64/20*     (2017.01)
    *B33Y 10/00*     (2015.01)
    *B33Y 50/02*     (2015.01)

(52) U.S. Cl.
    CPC ............... *B33Y 30/00* (2014.12); *B33Y 10/00* (2014.12); *B33Y 50/02* (2014.12)

(56) References Cited

U.S. PATENT DOCUMENTS

| | | | |
|---|---|---|---|
| 7,277,573 B1* | 10/2007 | O'Brien, Jr. | G06K 9/0051 382/154 |
| 2002/0145213 A1 | 10/2002 | Liu et al. | |
| 2004/0141018 A1* | 7/2004 | Silverbrook | B41J 3/543 347/4 |
| 2006/0099287 A1 | 5/2006 | Kim et al. | |
| 2009/0036188 A1* | 2/2009 | Gelman | G07F 17/3286 463/16 |
| 2010/0009133 A1* | 1/2010 | Chait | B29C 64/112 428/195.1 |

FOREIGN PATENT DOCUMENTS

| | | |
|---|---|---|
| CN | 101209583 A | 7/2008 |
| CN | 202264495 U | 6/2012 |
| CN | 102729476 A | 10/2012 |
| CN | 103921443 A | 7/2014 |
| CN | 104191616 A | 12/2014 |
| CN | 104527211 A | 4/2015 |
| CN | 204526170 U | 8/2015 |

* cited by examiner

MULTI-MATERIAL 3D OBJECT PRINT METHOD AND PRINT CONTROL APPARATUS

CROSS REFERENCE TO RELATED APPLICATIONS

This application is a continuation application of PCT application No. PCT/CN2016/093550, filed on Aug. 5, 2016, which claims priority to Chinese Patent Application No. 201510641821.8, filed on Sep. 29, 2015, the entire content of all of which are hereby incorporated by their reference.

Technical Field

The present invention generally relates to rapid prototyping technologies, and in particular, to a technology of layer-by-layer additive manufacturing of a 3D object by using an inkjet printhead, and specially, to a multi-material 3D object printing method and a print control apparatus.

Related Art

A rapid prototyping technology is also referred to as a rapid prototyping manufacturing technology. In this technology, under the control of a computer and based on a discrete/stacking principle, the physical shape of an object is transformed to a three-dimensional digital stereo model by using prototyping software or a three-dimensional scanner, this model is used to generate an STL file, layering software is used to discretize this model on the Z axis, to form a series of slices having a same thickness or different thicknesses, then a fused deposition modeling technology (FDM technology), a stereolithography technology (SLA technology), a selective laser sintering technology (SLS technology), a laminated object manufacturing technology (LOM technology), or the like is used to process and stack the series of slices layer by layer, and finally a 3D image is obtained by means of post-processing.

Compared with the conventional SLA, SLS, and LOM technologies, in a multi-jet printing technology (MJP technology), a fluid (a building material and/or a manufacturing material) in a nozzle chamber is formed into fluid drops instantly according to an operating principle of an inkjet printer and excited by a digital signal, and the fluid drops are ejected from a nozzle at a particular speed and a particular frequency and are cured layer by layer along a specified path, to finally obtain a 3D image. For use of the MJP, an expensive laser system is not required, and therefore the device price is low, and operation and maintenance costs are also very low. Compared with the FDM technology, use of the MJP technology allows an operation in a lower temperature; in addition, the MJP technology further has advantages such as a simple operation, a high prototyping speed, many applicable material types, high precision of a prototyping part, and usability in an office environment, and therefore the MJP technology is one of hotspots of current research of the rapid prototyping technology.

The existing MJP technology is often used for printing a single-material 3D object, and is used for printing a 3D object containing multiple materials (at least two materials) in few cases. There are two solutions to use the existing MJP technology to print a multi-material 3D object:

Solution 1: Corresponding materials are selected in advance according to textures of various portions of a multi-material 3D object, and in an inkjet print process, a printhead nozzle dispenses the selected materials according to the textures of the various portions, and stacks the selected materials layer by layer to form a 3D object. Disadvantages of the solution 1 are as follows: Each printhead corresponds to one print material, a quantity of printheads is limited, and correspondingly, a quantity of material types that can be selected for printing the multi-material 3D object by using the solution 1 is limited. In addition, for printing by using this solution, different materials need to be correspondingly and respectively developed according to the textures of the various portions of the 3D object, leading to that labor costs and manufacturing costs are greatly increased.

Solution 2: A difference from the solution 1 is that, in the solution 2, multiple print materials do not need to be separately developed according to textures of various portions of a 3D object in advance, but multiple basic inkjet print materials are selected according to textures of various portions of a multi-material 3D object. In an actual print process, the multiple basic inkjet print materials are mixed according to different proportions to form different types of print materials, and the different types of print materials correspond to the textures of the various portions of the multi-material 3D object. The solution 2 is improved based on the solution 1, but still has disadvantages: For a 3D object formed by means of printing by using the solution 2, materials may be distributed unevenly in a horizontal direction or a vertical direction, and mixing proportions of the multiple basic inkjet print materials are not arbitrary. As a result, a requirement for personalized design cannot be met.

SUMMARY

For disadvantages of the prior art, according to an aspect of the present invention, a multi-material 3D object printing method is provided, including the following steps:

a. randomly generating at least one group of area print data based on each group of area information of a target object, then correspondingly generating layer print data according to multiple groups of area information of each layer of the target object, and forming the multiple groups of layer print data into 3D object print data;

b. performing layer-by-layer printing based on the 3D object print data; and c. stacking layer-by-layer printing products from the step b to form a 3D object.

Preferably, a randomness test is separately performed on the at least one group of area print data, and Y groups of area print data thereof that fail the randomness test are discarded, and Y groups of area print data are randomly generated, wherein $Y \geq 0$.

Preferably, the randomness test is performed in the following manner: after each group of area print data is generated, one randomness test is performed.

Preferably, the randomness test is performed by using a run test method.

Preferably, each group of area information includes at least a quantity N of pixels included in a corresponding area of the area information, M types of included materials, and proportions of materials, wherein the M types of materials are associated with the area print data, and the M types of materials include a first material, a second material, ..., an $(M-2)^{th}$ material, an $(M-1)^{th}$ material, and an $M^{th}$ material.

Preferably, the area print data is generated in the following manner:

randomly generating M−1 groups of area print data according to each group of area information, wherein the M−1 groups of area print data include a first group of area print data, a second group of area print data, . . . , and an $X^{th}$ group of area print data, wherein the area print data is binary data and $1 \leq X \leq M-1$, wherein $M \geq 2$, and correspondingly, the number of the $X^{th}$ group of area print data is $N \times (R_X + \ldots + R_M)$, $R_X$ is a proportion of an $X^{th}$ material, $R_M$ is a proportion of an $M^{th}$ material, and the number of 0s or 1s in the $X^{th}$ group of area print data is $N \times R_X$.

Preferably, an $(M-1)^{th}$ group of area print data in the M-1 groups of area print data is associated with the $(M-1)^{th}$ material and the $M^{th}$ material, and then the following steps are performed:

a1. generating new complementary area print data from the $(M-1)^{th}$ group of area print data; and a2. associating the $(M-1)^{th}$ group of area print data and the complementary area print data with the $(M-1)^{th}$ material and the $M^{th}$ material.

Preferably, the complementary area print data is generated by performing the following steps:

i1. generating reference data whose number is the same as that of the $(M-1)^{th}$ group of area print data, and performing binary assignment on the reference data to form reference data whose values are all 1; and i2. calculating a difference between the reference data and the $(M-1)^{th}$ group of area print data, to obtain the complementary area print data.

Preferably, the first group of area print data, the second group of area print data, . . . , and an $(M-2)^{th}$ group of area print data in the M-1 groups of area print data are associated with the first material, the second material, . . . , and the $(M-2)^{th}$ material, and then the following steps are performed:

a3. correcting at least one group of to-be-corrected area print data in the first group of area print data, the second group of area print data, . . . , and the $(M-2)^{th}$ group of area print data, to correspondingly obtain at least one group of corrected area print data; and a4. correspondingly replacing the to-be-corrected area print data with the corrected area print data obtained after the correction.

Preferably, the corrected area print data is generated by performing the following steps:

i3. generating corrected data whose number is the same as that of the to-be-corrected area print data, and performing binary assignment on the corrected data to form corrected data whose values are all 1; and i4. calculating a difference between the corrected data and the to-be-corrected area print data, to obtain the corrected area print data.

Preferably, a corresponding area of each group of area information is divided into L rows and I columns, and $N = L \times I$.

Preferably, the area information is obtained by performing the following steps:

a1. obtaining model data of the target object;

a2. obtaining material composition of different portions of the model data and proportions of materials; and a3. performing layering processing on the target object, to obtain a quantity of pixels in a corresponding area of each layer, a material type, and a proportion of each material.

Preferably, the area print data is randomly generated by using a random number generator.

Preferably, the proportions of the materials are mass percentages.

Preferably, in the step c, each of the layer-by-layer printing products is cured and then stacked.

Preferably, in the step c, after being leveled, each of the layer-by-layer printing products is first cured and then stacked.

According to another aspect of the present invention, a print control apparatus is provided, including a data processor, a process controller, and a printhead, wherein the data processor, the process controller, and the printhead separately perform communication, wherein the data processor is configured to:

obtain area information and randomly generate area print data according to the area information, and perform a randomness test and processing on the generated area print data, to generate 3D object print data; and the process controller controls the printhead to perform layer-by-layer printing based on the 3D object print data, and stacks layer-by-layer printing products.

Preferably, the print control apparatus further includes a leveling apparatus, configured to level each of the layer-by-layer printing products.

Preferably, the print control apparatus further includes a curing apparatus, configured to cure each of the layer-by-layer printing products.

In the present invention, area print data is randomly generated according to area information, different area print data in a same layer jointly forms layer print data, multiple groups of layer print data jointly form 3D object print data, and layer-by-layer printing is performed according to the 3D object print data, to generate a 3D object. The present invention has the following advantages:

1. Area print data in the present invention is randomly generated, and a randomness test is performed on the generated print data. Data proportioning does not need to be manually performed layer by layer, and therefore this is highly intelligent. In addition, when a randomness test is performed, a stable structure feature can be implemented by manually adjusting a significance level parameter.

2. In the present invention, different basic materials are mixed in a corresponding area of each group of area information according to any proportion, and mixture proportions of different corresponding areas may also be different, thereby meeting a requirement for personalized design.

3. By means of the present invention, a texture of a 3D object generated by means of printing is homogeneous, thereby expanding the application scope of manufacturing a 3D object by using an inkjet printing technology, and implementing smooth transition between materials in different areas of a same 3D object.

BRIEF DESCRIPTION OF THE DRAWINGS

Reading detailed descriptions about nonrestrictive embodiments with reference to the following accompanying drawings will make other features, objectives, and advantages of the present invention clearer.

DETAILED DESCRIPTION

Figure 1:
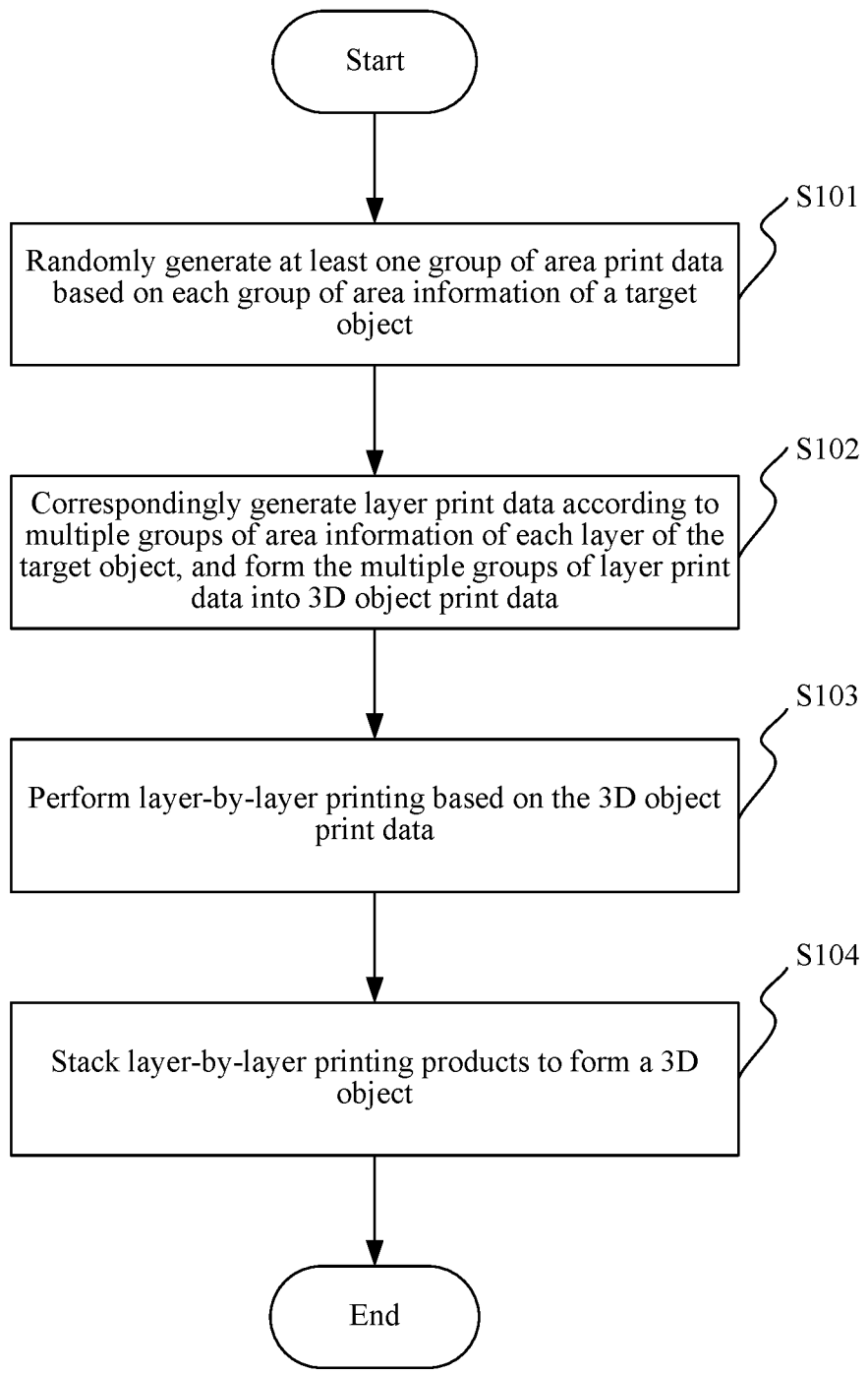
FIG. 1 is a flowchart of a multi-material 3D object printing method according to a specific implementation of the present invention.

FIG. 1 is a flowchart of a multi-material 3D object printing method according to a specific implementation of the present invention. A person skilled in the art understands that, FIG. 1 shows only core steps of printing a multi-material 3D object, and additionally includes a step in the present invention that is different from that in the prior art. In an actual print process, multiple pre-processing steps and multiple post-processing steps after a 3D object is generated are further included. These steps are all general steps in the field of 3D print technologies. Although these general steps are not shown in FIG. 1, it does not mean that these general steps are not performed in the present invention. A person skilled in the art may perform a print process of the present invention with reference to the steps shown in FIG. 1 and the general steps in the prior art. The following provides specific descriptions with reference to FIG. 1:

First, step S101 of randomly generating at least one group of area print data based on each group of area information of a target object is performed. A person skilled in the art understands that, in the present invention, a target object is divided into different areas according to actual composition of the target object, and the different areas include different area information; in addition, corresponding area print data is randomly generated based on each group of area information. Specifically, a step of obtaining the area information is a pre-processing step that is not shown in FIG. 1. One of relatively common manners may be implementing grouping by using software installed in a PC terminal. A relatively simple grouping manner is that, the target object is placed inside three-dimensional space, wherein the X, Y, and Z axes are three coordinate axes that are perpendicular to each other in the three-dimensional space; the target object is divided into multiple layers in the Z axis direction; and each layer is further divided into multiple groups of areas. Correspondingly, each group of areas includes corresponding area information, the area information includes a parameter related to the print process, the area information includes at least a quantity of pixels in a corresponding area of the area information, and the quantity of pixels decides resolution of the area. More specifically, the area information may further include a material type and proportions of materials in the corresponding area of the area information, the material type may further include a material property, a material color, a material physical status, or the like, and the proportions of the materials may be mass percentages, or may be volume percentages. In a variation, the target object is directly designed, and correspondingly, the area information is already determined in a process of designing the target object. This is specifically described hereinafter, and details are not described herein.

Further, the area print data is randomly generated based on the area information. Compared with manual data orchestration in the prior art, the generation of the area print data in the step is highly automated, quick, and intelligent. Specifically, for each group of area information, only one group of print data may be generated; or multiple groups of print data may be generated. For example, a corresponding area of the area information includes two types of materials, and the two types of materials are proportioned in only one manner, and then correspondingly, only one group of print data is generated. For another example, the corresponding area of the area information includes multiple types of materials (more than three types of materials), and then correspondingly, multiple groups of area print data are generated. More specifically, during actual application, the area print data is binary data, that is, the area print data includes 0 and 1, and the area print data that is generally randomly generated by using a random number generator. The random number generator may be a device that generates a random sequence, or may be only an algorithm for generating a random sequence. For example, the area print data may be randomly generated by using data generation software installed in a PC terminal. A person skilled in the art understands that, for a 3D object that is formed based on the randomly generated area print data, material homogeneity of the 3D object in a layering direction can be achieved. For example, the target object is layered in the Z axis direction, thereby implementing smooth transition between materials in the Z axis direction, and ensuring material homogeneity in the Z axis direction.

A person skilled in the art understands that, real random data needs to be generated by means of a physical phenomenon, for example, coin tossing, dicing, wheeling, a noise caused by using an electronic component, nuclear fission, or the like. Correspondingly, a physical random number generator needs to be used to generate the real random data. However, during actual application, most random numbers are generated by using a random number generation algorithm. The random number generation algorithm is an algorithm, and therefore is undoubtedly implemented by using a fixed method of repeated calculation. Therefore, one-hundred-percent randomness cannot be ensured for a generated random number. Correspondingly, in a preferred embodiment, a randomness test is separately performed on the at least one group of area print data, the area print data meeting randomness is retained, and the area print data not meeting randomness is discarded. Specifically, if Y groups of area print data do not meet randomness, the Y groups of area print data that do not meet randomness are discarded, and Y groups of area print data are randomly generated. More specifically, the randomness test in this embodiment may be performed only once, or may be repeatedly performed many times, until all area print data succeeds in the randomness test. A person skilled in the art understands that, the randomness test is performed on the area print data corresponding to each group of area information, and therefore for a 3D object formed based on area print data finally formed in this embodiment, smooth transition between materials on each layer of the 3D object can be implemented, and material homogeneity of each layer of the 3D object is ensured. For example, the target object is evenly layered in the Z axis direction, thereby ensuring material homogeneity on the XZ plane in this embodiment.

Further, currently there are nearly one hundred randomness test methods, and a relatively representative method is the SP800-22 standard promulgated by the National Institute of Standards and Technology (NIST). This standard includes a total of 15 different test methods, which are respectively a monobit frequency test, a frequency test within a block, a run test, a test for the longest run within a block, a binary matrix rank test, a discrete Fourier transform test, a non-overlapping module matching test, an overlapping module matching test, a Maurer's universal statistical test, a linear complexity test, a sequence test, an approximate entropy test, a cumulative sum test, a random walk test, and a random walk state frequency test. These test methods may be used to test a randomness feature of binary data of any length, and are mainly dedicated to determine a great variety of randomness that may exist in data.

In a specific embodiment, the run test method is used to detect whether print data generated in areas on each layer has randomness. A person skilled in the art understands that, a run in the run test refers to sample points in a group of data that have a same feature and that consecutively appear, and a total quantity of runs in the group of data is referred to as the number of runs. For example, a group of data that is generated in step S101 and that includes 0 and 1 is 00000000010011011100000000, and the total number of runs in the group of data is 7. When the run test is performed, generally the number of runs in the group of data is observed first. If the number of runs in the group of data is excessively low, the group of data has a tendency for grouping, that is, 0s or 1s always appear in group. If the number of runs in the group of data is excessively high, the group of data has a tendency for mixing, that is, 0s and 1s always alternately appear. Therefore, correspondingly, the group of data has randomness and statistics of the data meet standardized normal distribution only when the number of runs is a proper value, that is, the number of runs is within a range. Specifically, a significance level may be used to determine whether the number of runs is proper, that is, whether the group of data has randomness. During actual application, there are multiple run test methods for selection. Specifically, in this embodiment, the run test is performed by using the Matlab algorithm. First, the randomly generated area print data is imported, the area print data is processed as data that can be identified by a run test function, and the significance level is entered, to perform the run test. During actual application, the significance level may vary. For example, the significance level is set to 0.05, 0.025, or 0.015. These belong to the prior art, and details are not described herein.

Further, in the foregoing specific embodiment, the randomness test is performed by using the run test method. In the prior art, there are many randomness test methods for selection. A person skilled in the art may select the most familiar randomness test method with reference to an actual situation. Details are not described herein.

Further, after step S101 is performed, step S102 of correspondingly generating layer print data according to multiple groups of area information of each layer of the target object, and forming the multiple groups of layer print data into 3D object print data is performed. According to an actual case, each layer of the target object may include multiple areas, and when area print data is generated in the manner in step S101, multiple pieces of area print data form layer print data of a corresponding layer, and the multiple groups of layer print data form the 3D object print data.

Further, after step S102 is performed, step S103 of performing layer-by-layer printing based on the 3D object print data is performed.

Further, after step S103 is performed, step S104 of stacking layer-by-layer printing products to form a 3D object is performed.

Figure 2:
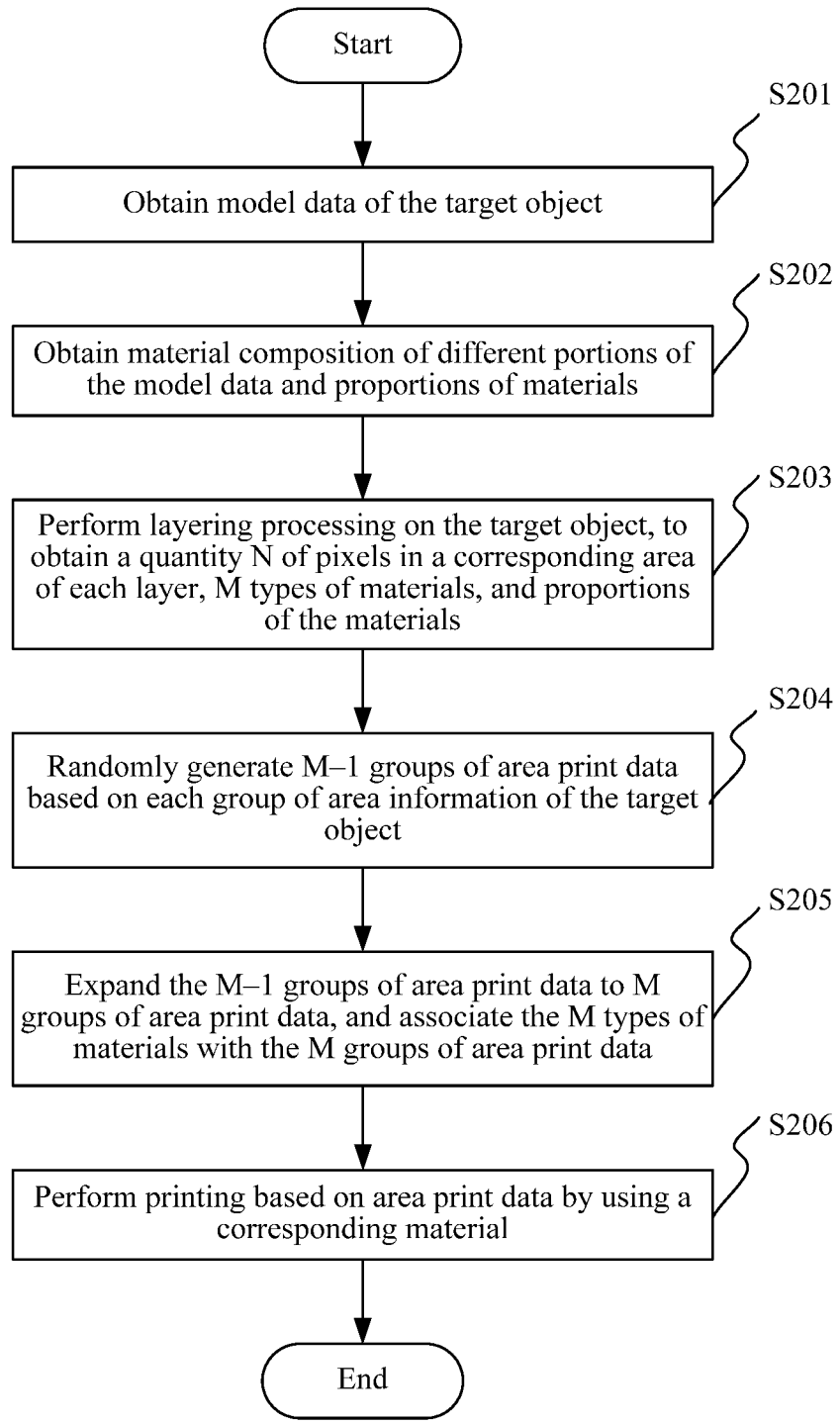
FIG. 2 is a flowchart of printing based on area print data according to an embodiment of the present invention.

In a first embodiment of the present invention, FIG. 2 is a flowchart of printing based on area print data. A person skilled in the art understands that, in an actual print process, printing is performed layer by layer. When printing for each layer (referred to as a print layer below) is performed, a printhead cyclically moves on the print layer, for example, moves from left to right or from right to left. In each moving process, the printhead may pass through different areas on the print layer, and correspondingly, the printhead performs printing at a corresponding location in a corresponding area according to a material corresponding to each group of area print data. After multiple moving processes, finally the printing for the print layer is complete, and layer print results are formed, and a final 3D object is formed after multiple layer print results are stacked. The embodiment shown in FIG. 2 describes a process of printing based on area print data. In this way, the print process in the present invention can be described in a more detailed manner. The entire print process in the present invention is actually repetition of the multiple print processes shown in FIG. 2.

First, step S201 of obtaining model data of the target object is performed. Specifically, in this embodiment, the print process is performed by using a PC terminal for assistance, and then the model data of the target object is imported into the PC terminal. The model data may be a CAD figure, a scanned solid figure, or the like.

Further, based on step S201, step S202 of selecting different areas according to the model data, and determining material types and proportions of materials in different areas is performed. Specifically, in this step, layering processing has not been performed on the target object. Therefore, the different areas selected in this step are actually solid structures. The material types and the proportions of materials in the different areas are determined according to the model data, and may be automatically determined, or may be manually determined. A person skilled in the art understands that, in a specific application process, although this embodiment may require the manual determining of the material types and the proportions of the materials in the different areas, this embodiment requires only determining of corresponding information of several different areas of the target object. Therefore, compared with the prior art, this embodiment has very light work load.

Further, based on step S202, step S203 of performing layering processing on the target object, to obtain a quantity N of pixels in each layer of a corresponding area, M types of materials, and proportions of the materials is performed. The quantity N of pixels in each layer of the corresponding area, the M types of materials, and the proportions of the materials are area information of the corresponding area. Specifically, after the target object is divided into multiple layers, each layer intersects the different areas in step S202, and then multiple corresponding areas are formed on each layer. The multiple corresponding areas correspond to multiple groups of area information. Specifically, the quantity N of pixels is obtained by dividing the corresponding area into rows and columns. For example, the corresponding area is divided into L lines and I columns, and then the quantity N of pixels=I×L.

Further, step S203 is implemented in a simplest layering manner, that is, the target object is evenly divided into multiple layers in the Z axis direction. In a more complex embodiment, step S203 is implemented by using a layering processing algorithm that is based on grouping and ranking and side intersection. A basic idea of the layering processing algorithm is that, overall grouping and ranking are performed according to geometric continuity of an STL model, a layering relationship matrix is established, and then side tracking and intersection are separately performed on triangular patches in the relationship matrix, to finally generate section contour data. The section contour data correspondingly forms one layer of the target object. Specifically, step S203 is implemented in the following manner: The first step is to perform grouping and ranking. A person skilled in the art understands that, compared with a size of a triangular patch in the STL model, a layer thickness of rapid prototyping is generally very small, and one triangular patch often intersects with multiple neighboring layering planes. Due to the geometric continuity of the STL model, triangular patches that insect with a layering plane are also continuously arranged. Therefore, a set of triangular patches that insect with neighboring layering planes except few layering planes is continuous, that is, a set of patches that insect with two neighboring layering planes basically remains unchanged. The second step is to perform side intersection, to obtain section contour data. A specific process is generally as follows: A series of sides and a group of tangent planes parallel to each other are known, intersection points between the sides and the group of planes are obtained, and all intersection points located on a same layer are arranged according to connection relationship sequence of the intersection points, to form closed section contours of layers. In an actual operation process, the foregoing step is generally implemented by using layering software, and a user only needs to operate the layering software.

Further, step S204 of randomly generating M−1 groups of area print data based on each group of area information of the target object is performed. Specifically, each group of area information includes the M types of materials. A person skilled in the art understands that, an objective of this step is to generate area print data. During actual application, drive and control data of most printheads are binary, and therefore the area print data is also binary data, that is, the area print data is data including 0s and 1s. Correspondingly, a printhead does not perform a print action at a 0 location in the area print data, and the printhead performs a print action at only a 1 location in the area print data. Therefore, the M types of materials need to correspond to M groups of area print data, that is, one group of area print data corresponds to one type of material, and in the one group of area print data, printing is performed at a 1 location by using the one type of material. More specifically, the M groups of area print data are not generated all at once, but formed after multiple steps, and step S204 is one of the steps.

Further, the M−1 groups of area print data include a first group of area print data, a second group of area print data, . . . , and an $X^{th}$ group of area print data, wherein $1 \le X \le M-1$, and $M \ge 2$ because the present invention relates to printing of a multi-material 3D object. Specifically, the area information includes the N pixels, and the N pixels are formed by the M types of materials. The area print data is generated to determine which type of material is correspondingly used to print each pixel. In this embodiment, the first group of area print data is generated first, and then a pixel corresponding to a 1 location in the first group of area print data is printed by using a first material; then, the second group of area print data needs to continue to be generated, and then a pixel corresponding to a 1 location in the second group of area print data is printed by using a second material; and the rest can be deduced by analogy. A person skilled in the art understands that, the numbers of the M−1 groups of area print data are not the same but vary. For example, the first group of area print data is used to determine pixels that are printed by using the first material, and the pixels printed by using the first material are determined relative to all pixels; therefore, the number of the first group of area print data should be the same as the quantity N of pixels in the area information. Correspondingly, to determine the second group of area print data, the pixels printed by using the first material do not need to be considered; therefore, the number of the second group of area print data is the quantity N of pixels in the area information minus a quantity of the pixels printed by using the first material, and the rest can be deduced by analogy.

Further, a quantity of pixels corresponding to each type of material is related to a proportion of the type of material. For example, the quantity of pixels printed by using the first material is a product of the quantity N of pixels in the area information and a proportion of the first material, and a quantity of pixels printed by using the second material is a product of the quantity N of pixels in the area information and a proportion of the second material. With reference to the description in the foregoing paragraph, the number of the first group of area print data should be $N \times R_1 + N \times R_2 . . . + N \times R_M$; the number of the second group of area print data should be $N \times R_2 + N \times R_1 . . . + N \times R_M$; and the rest can be deduced by analogy. Specifically, if $R_X$ indicates a proportion of an $X^{th}$ material, and $R_M$ is a proportion of an $M^{th}$ material, the number of the $X^{th}$ group of area print data is $N \times (R_X + . . . + R_M)$. More specifically, the area print data is randomly generated, and therefore a 0 location and a 1 location in the area print data are also random. However, a function of each group of area print data is to print a corresponding quantity of pixels by using a corresponding material, and therefore proportions of 0 and 1 in each group of area print data are related to a proportion of the corresponding material. For example, the proportion of the corresponding material is 20%, and then a quantity of 0s or 1s in each group of area print data is N×20%. That is, when the corresponding material corresponds to the value 0, the quantity of 0s is N×20%, and when the corresponding material corresponds to the value 1, the quantity of 1s is N×20%. More specifically, a printhead performs printing only when identifying 1, and therefore when the corresponding material corresponds to the value 0, each group of area print data further needs to be processed, so that a print process continues to be performed. A specific process is described below. According to the same principle, the number of 0s or 1s in the $X^{th}$ group of area print data should be $N \times R_X$.

Figure 3:
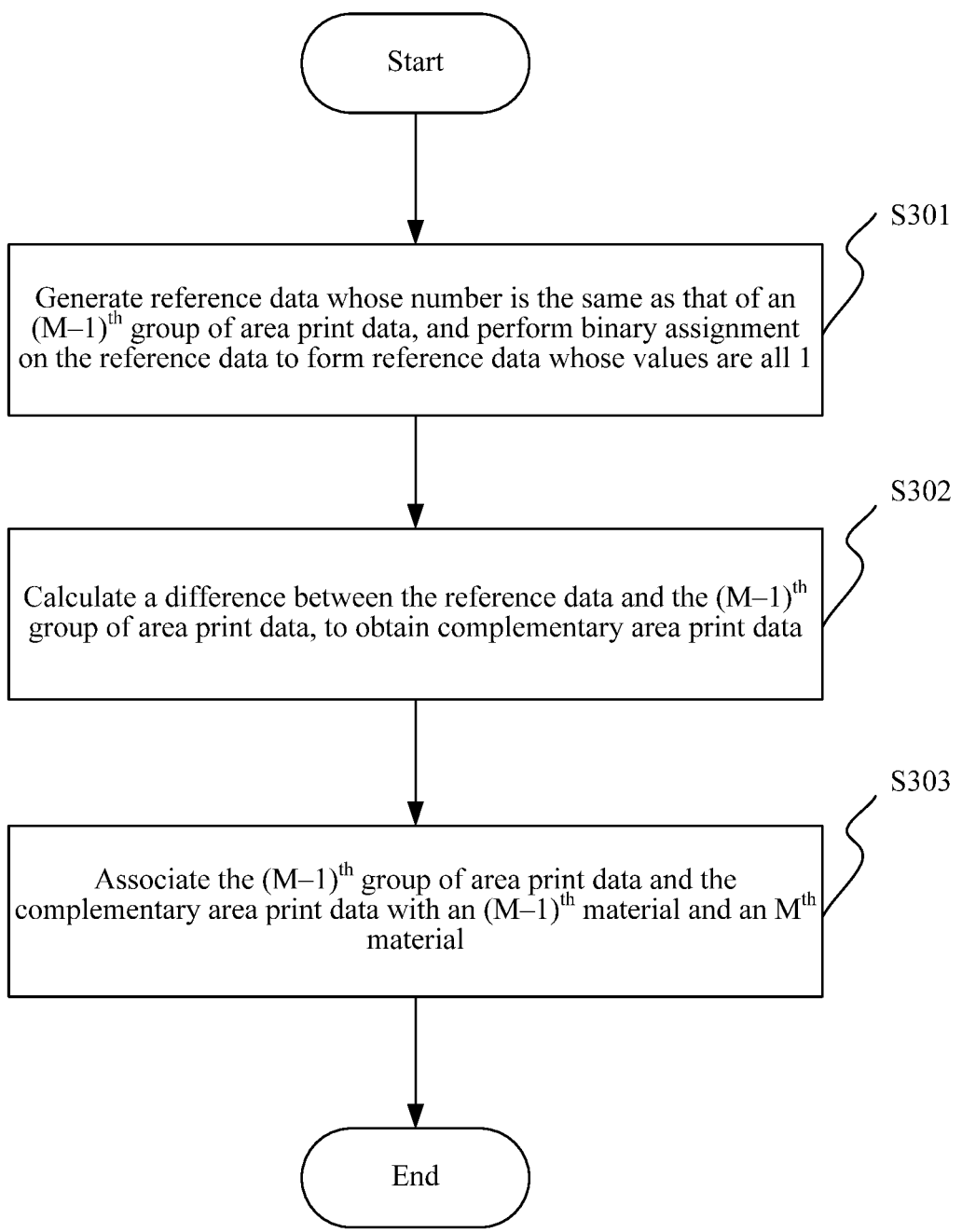
FIG. 3 is a flowchart of a method for supplementing area print data according to an embodiment of the present invention.

Further, step S205 of expanding the M−1 groups of area print data to M groups of area print data, and associating the M types of materials with the M groups of area print data is performed. Specifically, in step S204, the M−1 groups of area print data are generated, including the first group of area print data, the second group of area print data, . . . , and the $X^{th}$ group of area print data; in step S203, the M types of materials are obtained, including the first material, the second material, . . . , an $(M-2)^{th}$ material, an $(M-1)^{th}$ material, and the $M^{th}$ material. In this embodiment, an $(M-1)^{th}$ group of area print data is associated with the $(M-1)^{th}$ material and the $M^{th}$ material. An $(M-2)^{th}$ group of area print data is area print data when a value of X is M−2, and the $(M-1)^{th}$ group of area print data is area print data when the value of X is M−1. More specifically, the $(M-1)^{th}$ group of area print data is associated with both the $(M-1)^{th}$ material and the $M^{th}$ material. However, in an actual print process, one group of area print data can implement printing of only one type of material. Therefore, the $(M-1)^{th}$ group of area print data needs to be supplemented. Specifically, FIG. 3 is a flowchart of a method for supplementing area print data.

First, step S301 of generating reference data whose number is the same as that of the $(M-1)^{th}$ group of area print data, and performing binary assignment on the reference data to form reference data whose values are all 1 is performed. For example, when number of the area print data is 25, the reference data also includes 25 numbers including only the value 1.

Further, step S302 of calculating a difference between the reference data and the $(M-1)^{th}$ group of area print data, to obtain complementary area print data is performed. Correspondingly, the M−1 groups of area print data and the complementary area print data jointly form the M groups of area print data. That is, the M groups of area print data correspondingly include the first group of area print data, the second group of area print data, . . . , and the $X^{th}$ group of area print data, and the complementary area print data. A person skilled in the art understands that, the complementary area print data obtained in step S302 also includes 0 and 1. Actually, compared with the $(M-1)^{th}$ group of area print data, the finally generated complementary area print data complies with a rule, that is, a 0 location in the $(M-1)^{th}$ group of area print data correspondingly changes to 1, and a 1 location in the $(M-1)^{th}$ group of area print data correspondingly changes to 0.

Further, step S303 of associating the $(M-1)^{th}$ group of area print data and the complementary area print data with the $(M-1)^{th}$ material and the $M^{th}$ material is performed. Specifically, before the supplementation step in FIG. 3 is performed, the $(M-1)^{th}$ group of area print data is associated with both the $(M-1)^{th}$ material and the $M^{th}$ material. If the value 0 in the $(M-1)^{th}$ group of area print data indicates the $(M-1)^{th}$ material, and the value 1 indicates the $M^{th}$ material, after the supplementation step in FIG. 3 is correspondingly performed, the complementary area print data is associated with the $(M-1)^{th}$ material, and the $(M-1)^{th}$ group of area print data is associated with the $M^{th}$ material. On the contrary, before the supplementation step in FIG. 3 is performed, if the value 1 in the $(M-1)^{th}$ group of area print data indicates the $(M-1)^{th}$ material, and the value 0 indicates the $M^{th}$ material, after the supplementation step in FIG. 3 is performed, the complementary area print data is associated with the $M^{th}$ material, and the $(M-1)^{th}$ group of area print data is associated with the $(M-1)^{th}$ material. A principle thereof is also based on the print principle described above. That is, if the value 1 indicates the Mth material before the supplementation step in FIG. 3 is performed, a pixel printed by using the $M^{th}$ material is already determined for the $(M-1)^{th}$ group of area print data. Therefore, to generate the complementary area print data, only a pixel printed by using the $(M-1)^{th}$ material needs to be determined. Correspondingly, the complementary area print data is associated with the $(M-1)^{th}$ material. On the contrary, a principle thereof is also the same, and details are not described herein.

Figure 4:
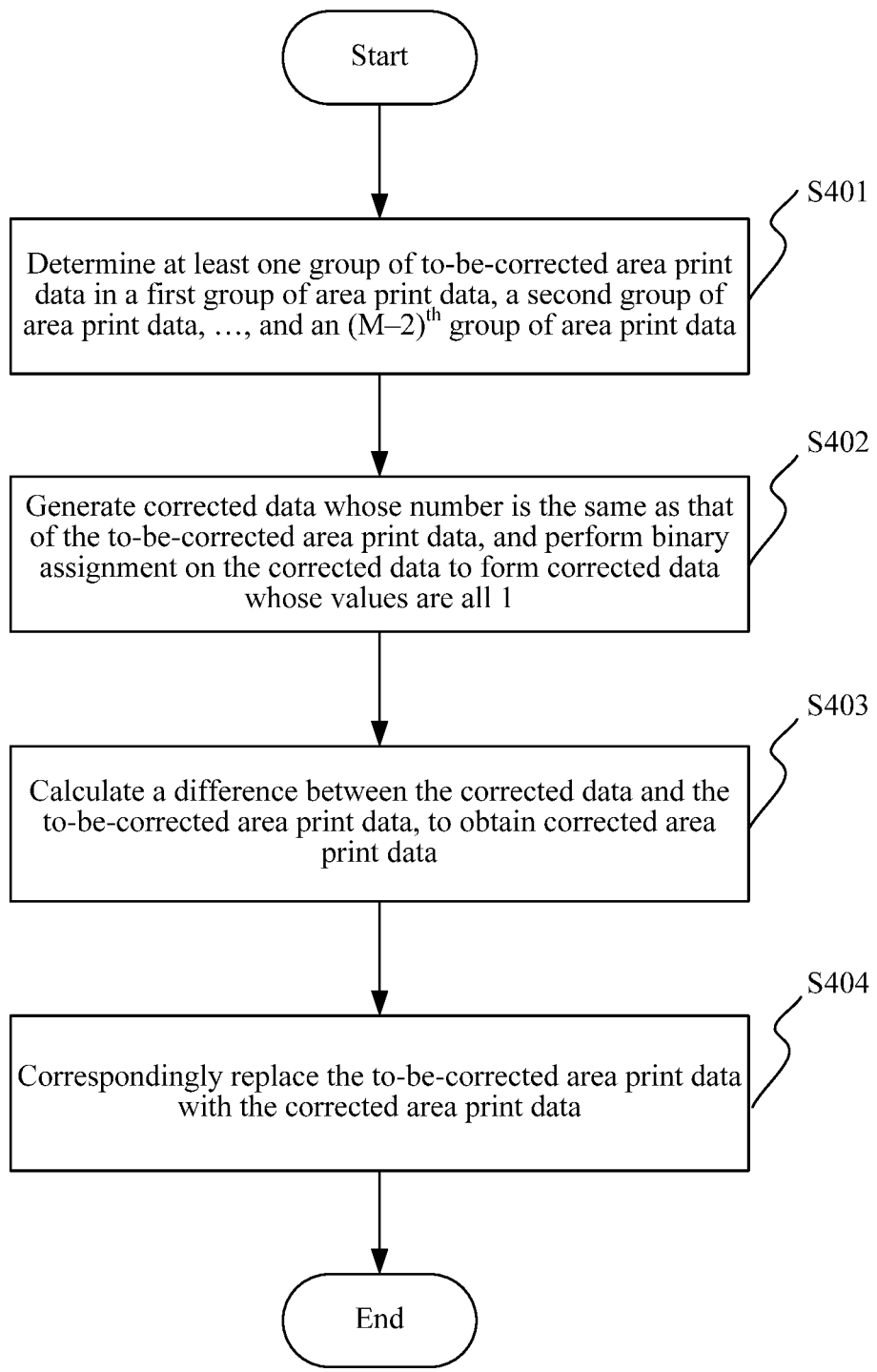
FIG. 4 is a flowchart of a method for correcting area print data according to an embodiment of the present invention.

Further, in this embodiment, the first group of area print data, the second group of area print data, . . . , and the $(M-2)^{th}$ group of area print data are also associated with the first material, the second material, . . . , and the $(M-2)^{th}$ material. Correspondingly, if in the first group of area print data, the second group of area print data, . . . , and the $(M-2)^{th}$ group of area print data, the first material, the second material, . . . , and the $(M-2)^{th}$ material are all indicated by using the value 1, the first group of area print data, the second group of area print data, . . . , and the $(M-2)^{th}$ group of area print data are directly transmitted to a process controller, and the process controller controls a printhead to perform printing. A person skilled in the art understands that, the area print data is randomly generated. During actual application, the first group of area print data, the second group of area print data, . . . , and the $(M-2)^{th}$ group of area print data may include at least one group of to-be-corrected area print data. In the to-be-corrected area print data, a corresponding material is indicated by using the value 0. In this case, a correction step needs to be performed on the to-be-corrected area print data, to correspondingly obtain at least one group of corrected area print data, that is, a quantity of the to-be-corrected area print data is the same as a quantity of the obtained corrected area print data, and additionally the to-be-corrected area print data corresponds one-to-one to the obtained corrected area print data. Specifically, FIG. 4 is a flowchart of correcting the to-be-corrected area print data:

First, step S401 of determining at least one group of to-be-corrected area print data in the first group of area print data, the second group of area print data, . . . , and the $(M-2)^{th}$ group of area print data is performed. An implementation of this step is determining groups of area print data that are in the first group of area print data, the second group of area print data, . . . , and the $(M-2)^{th}$ group of area print data and in which a corresponding material is indicated by using the value 0, and then determining the groups of area print data as the to-be-corrected area print data.

Further, step S402 of generating corrected data whose number is the same as that of the to-be-corrected area print data, and performing binary assignment on the corrected data to form corrected data whose values are all 1 is performed. For example, when the number of the to-be-corrected area print data is 25, the reference data also includes 25 numbers including only the value 1.

Further, step S403 of calculating a difference between the corrected data and the to-be-corrected area print data, to obtain corrected area print data is performed. A person skilled in the art understands that, the corrected area print data obtained in step S403 also includes 0 and 1. Actually, compared with the to-be-corrected area print data, the finally generated corrected area print data complies with a rule, that is, a 0 location in the to-be-corrected area print data correspondingly changes to 1, and a 1 location in the to-be-corrected area print data correspondingly changes to 0.

Further, step S404 of correspondingly replacing the to-be-corrected area print data with the corrected area print data is performed. A person skilled in the art understands that, a reason for correcting the to-be-corrected area print data is that, in an actual print process, a print channel corresponding to each type of material is generally determined in advance, and correspondingly, area print data corresponding to the material is transmitted by using the corresponding print channel. If in area print data corresponding to a type of material (referred to as "the material" in the following part of this paragraph), the material is indicated by using the value 0, wherein an actual print process, a printhead can perform printing only when identifying the value 1; therefore, the printhead performs automatic matching to perform printing at a location of the value 1 by using the material, actually, printing needs to be performed at a location of the value 0 by using the material. To avoid such an error, when a corresponding material is indicated by using the value 0 in a group of area print data, the group of area print data is determined as to-be-corrected area print data, and is corrected by using steps S401 to S403; the corrected area print data obtained after the correction is transmitted to a process controller; the process controller controls, according to the corrected area print data, the printhead to perform printing, to implement printing at a correct location by using a corresponding material. For example, for a third group of area print data, a third material is indicated by using the value 0, the third group of area print data is corrected to obtain corrected area print data, and the third group of area print data is replaced with the corrected area print data, that is, the third group of area print data in the M groups of area print data needs to be changed to the corrected area print data.

Further, step S206 of performing printing based on area print data by using a corresponding material is performed. A person skilled in the art understands that, the area print data in this step may be initially generated area print data, or may be area print data that is generated after a randomness test fails, or may be complementary area print data, or may be corrected area print data. A specific type of area print data varies according to an actual situation, and that any type of the foregoing data needs to be generated is specifically described in the foregoing embodiments. Details are not described herein. Specifically, in a corresponding area of each group of area information, each type of material is printed according to area print data, of the material, in the corresponding area. More specifically, in this embodiment, different areas in a same layer may include different types of materials. For example, an A area includes an A material, a B material, and a C material, and a B area includes a C material, a D material, and an E material. Therefore, when performing printing according to area print data corresponding to the A material, the printhead performs a print action in the A area, but does not perform a print action in the B area because the B area does not include the A material. In addition, even if both the A area and the B area include the C material, proportions of the C material may be different. Therefore, when performing printing in the A area and the B area by using the C material, the printhead still performs printing according to different area print data corresponding to the C material, and printing manners are different. A person skilled in the art understands that, in this specific example, a visualized description is provided by using only the A area and the B area. In an actual print process, more print areas and more material types may be further included. In addition, proportions of various types of materials may be different in different areas, but a basic print principle is the same. A person skilled in the art may make different variations on this basis, and this is an innovative point that distinguishes the present invention from the prior art.

The following describes, by using three specific embodiments, how to perform printing in an area according to corresponding area print data by using a corresponding material. A person skilled in the art understands that, in the following embodiments, descriptions are provided by using an area as a unit, but in an actual print process, printing is not performed according to a sequence of areas. In a print process, the printhead is placed at a specific location before printing is started, and after the printing is started, the printhead generally moves according to a specified moving track, for example, moves from left to right or moves from right to left. In a moving process of the printhead, the printhead performs printing at a corresponding location according to determined area print data by using a corresponding material. Therefore, in the entire print process, printing of a next area is not performed only after a complete area is printed, but a complete print layer is gradually formed according to a moving track of the printhead. Correspondingly, the following specific embodiments are used to describe a basis for printing in each area, but are not used to describe a sequence of printing in each area.

In a specific embodiment, there are two types of materials in a group of area information, which are respectively an A material and a B material. A proportion of the A material is 80%, and a proportion of the B material is 20%. A quantity of pixels is 25, 0 indicates the A material, and 1 indicates the B material. In this case, a group of area print data 0000000001001101100000000 that includes 0s and 1s is generated, wherein the A material appears for 80%*25=20 times, the B material appears for 20%*25=5 times, and a total number of runs is 7. Subsequently, a run test is performed on the area print data 0000000001001101100000000, and a result of the run test is a failure, this group of data is discarded, and new area print data 0001001000010001000001000 is generated, wherein the A material appears for 80%*25=20 times, the B material appears for 20%*25=5 times, and a total number of runs is 11. The run test is performed again, and a result of the run test is a success, the generated area print data 0001001000010001000001000 can be used as valid data, and the area print data 0001001000010001000001000 is used as area print data corresponding to the B material.

Further, the area print data 0001001000010001000001000 is corrected, to generate corrected data 1111111111111111111111111, and a difference between the corrected data 1111111111111111111111111 and the area print data 0001001000010001000001000 is calculated, to obtain corrected area print data 1110110111101110111110111. The corrected area print data 1110110111101110111110111 is used as area print data corresponding to the A material. The corrected area print data 1110110111101110111110111 and the area print data 0001001000010001000001000 are respectively transmitted to a process controller by using dedicated transmission channels, and the process controller performs printing by correspondingly using the A material and the B material.

In another specific embodiment, there are three types of materials in the area information, which are respectively an A material, a B material, and a C material. A proportion of the A material is 20%, a proportion of the B material is 40%, a proportion of the C material is 40%, and a quantity of pixels is 25. Correspondingly, a first group of area print data 0001001000010001000001000 is generated, and a run test is performed on the first group of area print data. A result of the run test of the first group of area print data is a success. Next, a second group of area print data 001111100000011111000 is generated, and a run test is performed on the second group of area print data. A result of the run test of the second group of area print data is a failure. Correspondingly, a new second group of area print data 10101001100100111100 is generated. In the first group of area print data 0001001000010001000001000, 1 indicates the A material, and 0 indicates the B material and the C material. In the new second group of area print data 10101001100100111100, 1 indicates the B material, and 0 indicates the C material.

Further, complementary area print data 01010110011011000011 is generated according to the new second group of area print data 10101001100100111100. Correspondingly, the first group of area print data 0001001000010001000001000 is used as area print data corresponding to the A material, the new second group of area print data 10101001100100111100 is used as area print data corresponding to the B material, and the complementary area print data 01010110011011000011 is used as area print data corresponding to the C material. Finally, the first group of area print data 0001001000010001000001000, the new second group of area print data 10101001100100111100, and the complementary area print data 01010110011011000011 are respectively transmitted to a process controller by using dedicated transmission channels, and the process controller performs printing by correspondingly using the A material, the B material, and the C material.

In another specific embodiment, there are four types of materials in the area information, which are respectively an A material, a B material, a C material, and a D material. A proportion of the A material is 20%, a proportion of the B material is 40%, a proportion of the C material is 20%, a proportion of the D material is 20%, and a quantity of pixels is 25. First, a first group of area print data 000100100001000100001000 is generated, and a run test is performed on the first group of area print data. A result of the run test is a success. Next, a second group of area print data 001111110000011111000 is generated, and a run test is performed on the second group of area print data. In this case, a result of the run test is a failure, and then the second group of area print data that fails the test is discarded and a new second group of area print data 10101001100100111100 is generated. A run test is performed on the new second group of area print data. After the run test succeeds, a third group of area print data 0100110101 is generated, and a run test is performed on the third group of area print data. A result of the run test of the third group of area print data is a success.

Further, in the first group of area print data 000100100001000100001000, 1 indicates the A material, 0 indicates the B material, the C material, and the D material; in the new second group of area print data 10101001100100111100, 0 indicates the B material, 1 indicates the C material and the D material; in the third group of area print data 0100110101, 1 indicates the C material, and 0 indicates the D material. Correspondingly, the new second group of area print data 10101001100100111100 is corrected, to obtain corrected area print data 01010110011011000011, and complementary area print data 1011001010 is generated according to the third group of area print data 0100110101. Then, the first group of area print data 000100100001000100001000 is used as area print data corresponding to the A material, the corrected area print data 01010110011011000011 is used as area print data corresponding to the B material, the third group of area print data 0100110101 is used as area print data corresponding to the C material, and the complementary area print data 1011001010 is used as area print data corresponding to the D material. Finally, the first group of area print data 000100100001000100001000, the corrected area print data 01010110011011000011, the third group of area print data 0100110101, and the complementary area print data 1011001010 are respectively transmitted to a process controller by using dedicated transmission channels, and the process controller performs printing by correspondingly using the A material, the B material, the C material, and the D material.

Figure 5:
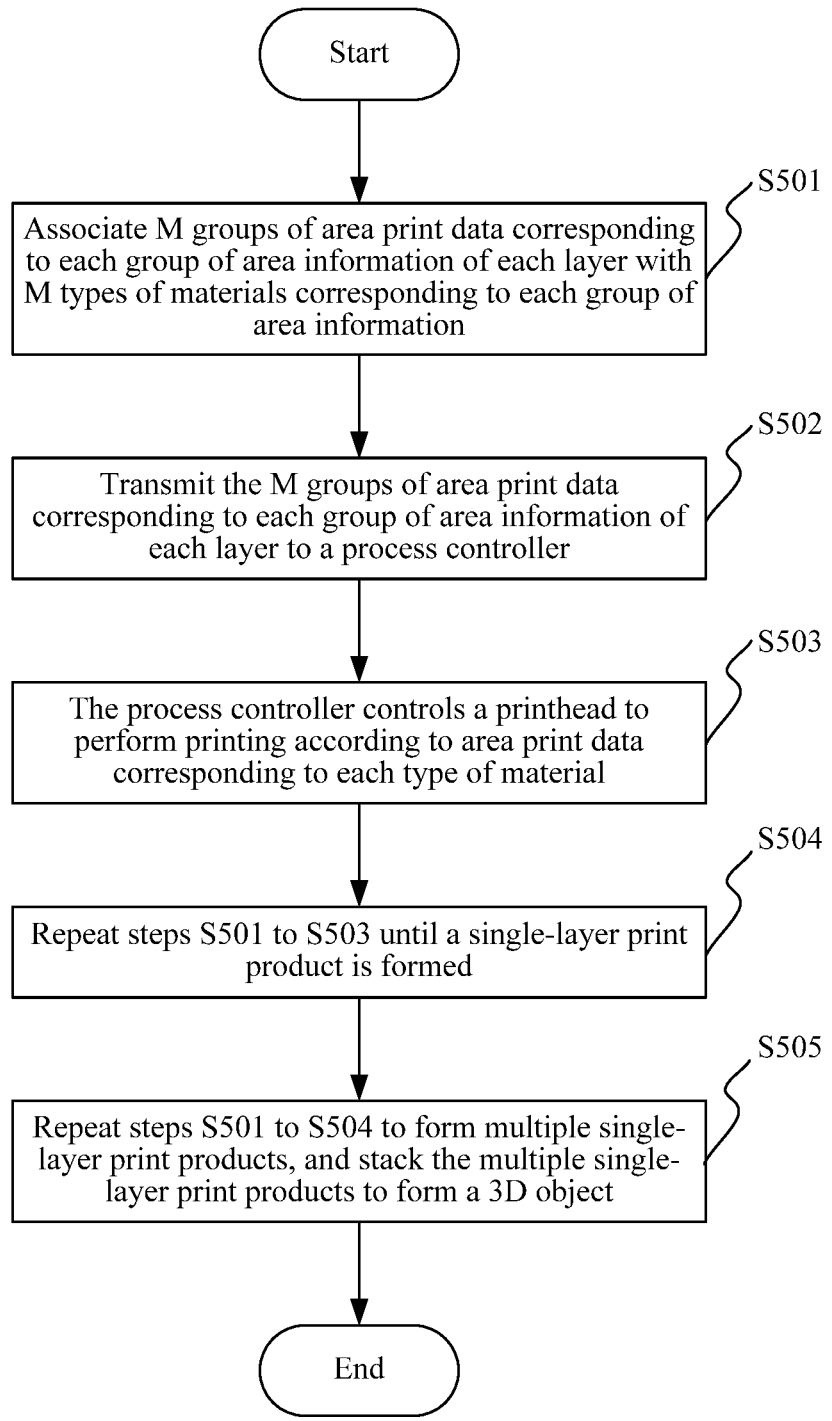
FIG. 5 is a flowchart of a multi-material 3D object printing method according to an embodiment of the present invention.

In a second embodiment of the present invention, FIG. 5 is a flowchart of a multi-material 3D object printing method, specifically:

First, step S501 of associating area print data corresponding to each group of area information of each layer with M types of materials corresponding to each group of area information is performed. A person skilled in the art understands that, each group of area information correspondingly includes M groups of area print data. The M groups of area print data includes at least the M−1 groups of area print data in step S204 in the first embodiment and complementary area print data. In a variant embodiment, a randomness test step and a correction step are further performed on the M−1 groups of area print data. This is described above, and details are not described herein.

Further, based on step S501, step S502 of transmitting the M groups of area print data corresponding to each group of area information of each layer to a process controller is performed. Specifically, in an actual print process, M transmission channels are set for the process controller, and the M groups of area print data are respectively transmitted to the process controller by using the M transmission channels.

Further, step S503 of controlling, by the process controller, a printhead to perform printing according to area print data corresponding to each type of material is performed. Specifically, this embodiment relates to the M groups of area print data, but it does not indicate that a same quantity of printheads need to be set in this embodiment to achieve an objective of this embodiment. For example, as shown in step S502, the M groups of area print data are transmitted to the process controller by using the M transmission channels. However, one type of material is correspondingly associated with one group of area print data. Actually, one type of material is correspondingly associated with one transmission channel, and a printhead identifies a transmission channel, and then determines which material is used to perform printing. Therefore, there may be one or more printheads. This only affects a speed of printing a 3D object in the present invention, but does not affect achievement of the objective of this embodiment.

Further, step S504 of repeating steps S501 to S503 until a single-layer print result is formed is performed. A person skilled in the art understands that, during actual application, after the target object is layered, each layer includes multiple groups of area information, and an objective that needs to be achieved in step S501 to step S503 is how to perform printing by using each type of material according to area print data corresponding to this type of material. Specifically, multiple groups of area information included in each layer correspond to multiple areas of each layer, and area print data that is corresponding to each type of material and that is in multiple pieces of area information is also different, that is, each type of material also corresponds to multiple groups of area print data in multiple groups of area information. Correspondingly, in a print process, each type of material also has a different print manner in multiple areas. Therefore, if step S501 to step S503 are performed only once, single-layer printing cannot be completed. Step S501 to step S503 need to be cyclically performed for multiple times to complete single-layer printing and form the single-layer print result. A quantity of cycles is related to a quantity of printheads, a quantity of area information included in each layer, and a quantity of material types. In an actual print process, personalized design can be performed, as long as a complete single-layer print result can be formed.

Further, step S505 is performed. A person skilled in the art understands that, similar to a principle of step S504, the single-layer print result is formed in step S501 to step S503, but the target object includes multiple layers. Therefore, steps S501 to S504 need to be repeatedly performed to form multiple single-layer print results, and finally the multiple single-layer print results are stacked to form a 3D object. Correspondingly, a quantity of times for repeating steps S501 to S504 is the same as a quantity of layers included in the target object.

In a preferred embodiment, in step S505, the single-layer print results are first cured and then stacked, to reduce a size error of the 3D object. In a variation, the single-layer print results are first leveled and then cured, thereby further improving size precision of the 3D object.

In another specific implementation of the present invention, a print control apparatus is provided, including a data processor, a process controller, and a printhead, wherein the data processor, the process controller, and the printhead separately perform communication. Specifically, the data processor is configured to: obtain area information and randomly generate area print data according to the area information, and perform a randomness test and processing on the generated area print data, to generate 3D object print data. A person skilled in the art understands that, the data processor generally includes a central processing unit, a main memory, and an input-output interface, and is a component configured to: process data and execute an instruction according to steps stipulated in a program. A common work process is that, the central processing unit reads model data of a target object from the main memory by using the input interface, processes the model data to obtain area information, and then randomly generates area print data according to the area information. In some variant embodiments, the central processing unit may further perform a randomness test on the area print data, or correct the area print data, or generate complementary area print data according to the area print data. These are all processing of the area print data, and details are not described herein. The data processor finally generates a series of area print data in the foregoing manner, and the series of area print data jointly forms 3D object print data.

Further, the 3D object print data is transmitted to the process controller by using a data transmission channel. The process controller generally includes a central processing unit, a main memory, and an input-output interface. The process controller is configured to: convert specific data into a print instruction and store the print instruction in the main memory, and can read the print instruction when running, to form a control signal to be assigned to various parts for execution. A common work process is that, the central processing unit receives the 3D object print data by using the input interface, generates a specific print instruction according to the 3D object print data, and stores the specific print instruction in the main memory. In a specific embodiment, a first print instruction to perform printing by using a first material is generated according to first area print data; a second print instruction to perform printing by using a second material is generated according to second area print data; and the rest can be deduced by analogy. Finally, a corresponding print instruction is converted into a corresponding control signal, and the control signal is output to a printhead by using the output interface, and the printhead performs printing according to the control signal, and finally forms multiple layer-by-layer printing products. The multiple layer-by-layer printing products are stacked to form a 3D object. In another variant embodiment, the process controller does not convert a print instruction into a control signal, but directly outputs a generated print instruction to the printhead by using the output interface. In this case, the printhead performs matching between the received print instruction and an instruction set in the printhead; if the matching succeeds, a print action is performed, or if the matching fails, a print action is not performed.

In a preferred embodiment, the print control apparatus further includes a leveling apparatus and a curing apparatus. The leveling apparatus is configured to level each of the layer-by-layer printing products. Preferably, the leveling apparatus includes a transmission apparatus and a function apparatus. The function apparatus may be a flat roller or a scraper, and the transmission apparatus may be a mechanical arm. The curing apparatus is configured to cure each of the layer-by-layer printing products, and according to different materials, the curing apparatus may be a heat curing apparatus, or may be a light curing apparatus.

The foregoing describes the specific embodiments of the present invention. It needs to be understood that, the present invention is not limited to the foregoing particular implementations, and a person skilled in the art may make various variations or modifications within the scope of the claims. This does not affect essential content of the present invention.

The invention claimed is:

1. A multi-material 3D object printing method, comprising steps:
   a. randomly generating at least one group of area print data based on each group of area information of a target object, correspondingly generating layer print data according to multiple groups of area information of each layer of the target object, and forming the multiple groups of layer print data into 3D object print data, wherein a randomness test is separately performed on the at least one group of area print data, and Y groups of area print data thereof that fail the randomness test are discarded, and Y groups of area print data are randomly generated, wherein Y≥0, wherein:
      each group of area information comprises at least a quantity N of pixels, M types of materials, and a proportion of each material, comprised in a corresponding area of the area information, wherein the M types of materials are associated with the area print data, and the M types of materials comprise a first material, a second material, . . . , an $(M-2)^{th}$ material, an $(M-1)^{th}$ material, and an $M^{th}$ material, wherein associating an $(M-1)^{th}$ group of area print data in the M-1 groups of area print data with the $(M-1)^{th}$ material and the $M^{th}$ material including:
         a1. generating new complementary area print data from the $(M-1)^{th}$ group of area print data; and
         a2. associating the $(M-1)^{th}$ group of area print data and the complementary area print data with the $(M-1)^{th}$ material and the $M^{th}$ material, and
      the area print data is generated by randomly generating M-1 groups of area print data according to each group of area information when each group of area information comprises M types of materials, wherein the M-1 groups of area print data comprise a first group of area print data, a second group of area print data, . . . , and an Xth group of area print data, wherein the area print data is binary data and 1≤X≤M-1, wherein M≥2, and correspondingly, the number of bits in the Xth group of area print data is N×(RX+ . . . +RM), RX is a proportion of an Xth material, RM is a proportion of an $M^{th}$ material, and the number of 0s or the number of 1s in the Xth group of area print data is N×RX;
   b. performing layer-by-layer printing based on the 3D object print data; and
   c. stacking layer-by-layer printing products from the step b to form a 3D object.

2. The printing method according to claim 1, wherein after each group of area print data is generated, one randomness test is performed.

3. The printing method according to claim 2, wherein the randomness test is performed by using a runs test method.

4. The printing method according to claim 1, wherein the complementary area print data is generated by:
   i1. generating reference data whose number of bits is the same as that of the $(M-1)^{th}$ group of area print data, and performing binary assignment on the reference data to form reference data whose values are all 1; and
   i2. calculating a difference between the reference data and the $(M-1)^{th}$ group of area print data, to obtain the complementary area print data.

5. The printing method according to claim 4, wherein the first group of area print data, the second group of area print data, . . . , and an $(M-2)^{th}$ group of area print data in the M-1 groups of area print data are associated with the first material, the second material, . . . , and the $(M-2)^{th}$ material, and the method further comprises:

a3. correcting at least one group of to-be-corrected area print data in the first group of area print data, the second group of area print data, . . . , and the $(M-2)^{th}$ group of area print data, to correspondingly obtain at least one group of corrected area print data; and a4. correspondingly replacing the to-be-corrected area print data with the corrected area print data obtained after the correction.

6. The printing method according to claim 5, wherein the corrected area print data is generated by:

i3. generating corrected data whose number of bits is the same as that of the to-be-corrected area print data, and performing binary assignment on the corrected data to form corrected data whose values are all 1; and i4. calculating a difference between the corrected data and the to-be-corrected area print data, to obtain the corrected area print data.

7. The printing method according to claim 1, wherein a corresponding area of each group of area information is divided into L rows and I columns, and N=L×I.

8. The printing method according to claim 7, wherein the area information is obtained by:

a1. obtaining model data of the target object;

a2. obtaining material composition of different portions of the model data and proportions of materials; and a3. performing layering processing on the target object, to obtain a quantity of pixels in a corresponding area of each layer, a material type, and a proportion of each material.

9. The printing method according to claim 8, wherein the area print data is randomly generated by using a random number generator.

10. The printing method according to claim 9, wherein the proportions of the materials are mass percentages.

11. The printing method according to claim 1, wherein in the step c, each of the layer-by-layer printing products is cured and then stacked.

12. The printing method according to claim 11, wherein in the step c, each of the layer-by-layer printing products is first leveled and cured, before being stacked.

13. A print control apparatus, comprising a data processor, a process controller, and a printhead, wherein the data processor is configured to: obtain area information and randomly generate area print data according to the area information, and perform a randomness test and processing on the generated area print data, to generate 3D object print data, wherein a randomness test is separately performed on the at least one group of area print data, and Y groups of area print data thereof that fail the randomness test are discarded, and Y groups of area print data are randomly generated, wherein Y≥0, wherein:

each group of area information comprises at least a quantity N of pixels, M types of materials, and a proportion of each material, comprised in a corresponding area of the area information, wherein the M types of materials are associated with the area print data, and the M types of materials comprise a first material, a second material, . . . , an $(M-2)^{th}$ material, an $(M-1)^{th}$ material, and an $M^{th}$ material, wherein associating an $(M-1)^{th}$ group of area print data in the M-1 groups of area print data with the $(M-1)^{th}$ material and the $M^{th}$ material including:

a1. generating new complementary area print data from the $(M-1)^{th}$ group of area print data; and a2. associating the $(M-1)^{th}$ group of area print data and the complementary area print data with the $(M-1)^{th}$ material and the $M^{th}$ material, and the area print data is generated by randomly generating M-1 groups of area print data according to each group of area information when each group of area information comprises M types of materials, wherein the M-1 groups of area print data comprise a first group of area print data, a second group of area print data, . . . , and an Xth group of area print data, wherein the area print data is binary data and 1≤X≤M-1, wherein M and correspondingly, the number of bits in the Xth group of area print data is N×(RX+ . . . +RM), RX is a proportion of an Xth material, RM is a proportion of an $M^{th}$ material, and the number of 0s or the number of is in the Xth group of area print data is N×RX; and the process controller controls the printhead to perform layer-by-layer printing based on the 3D object print data generated by the data processor, and stacks layer-by-layer printing products.

14. The print control apparatus according to claim 13, further comprising a leveling apparatus, configured to level each of the layer-by-layer printing products.

15. The print control apparatus according to claim 14, further comprising a curing apparatus, configured to cure each of the layer-by-layer printing products.

16. The printing method according to claim 1, wherein the randomness test is separately performed on the at least one group of area print data by manually adjusting a significance level parameter for each corresponding group of area print data of the at least one group of area print data.

* * * * *